(12) United States Patent
Wu (10) Patent No.: US 10,362,723 B2
(45) Date of Patent: Jul. 30, 2019

(54) HAND-OPERATED SPREADER

(71) Applicant: SK & Y AGRICULTURAL EQUIPMENTS CO., LTD., Fu Hsing Township, Changhua County (TW)

(72) Inventor: Jui-Chang Wu, Fu Hsing Township, Changhua County (TW)

(73) Assignee: SK & Y AGRICULTURAL EQUIPMENTS CO., LTD, Changhua County (TW)

( * ) Notice: Subject to any disclaimer, the term of this patent is extended or adjusted under 35 U.S.C. 154(b) by 37 days.

(21) Appl. No.: 15/860,048

(22) Filed: Jan. 2, 2018

(65) Prior Publication Data

US 2019/0200513 A1  Jul. 4, 2019

(51) Int. Cl.
*A01C 7/02* (2006.01)

(52) U.S. Cl.
CPC ..................... *A01C 7/02* (2013.01)

(58) Field of Classification Search
CPC .......... A01C 7/02; A01C 15/02; A01C 15/12; A01C 15/124; A01C 15/14; A01C 7/163; A01C 7/16; A01C 7/20; A01C 7/10; A01C 7/102; A01C 7/18; A01C 7/002; A01C 7/08; A01C 11/006; A01C 11/00; A01C 15/003; A01C 17/006
USPC ..... 111/130, 106, 108, 170, 200, 11–13, 7.1, 111/7.3
See application file for complete search history.

(56) References Cited

U.S. PATENT DOCUMENTS

| | | | | |
|---|---|---|---|---|
| 977,886 A | * | 12/1910 | Lawrence ................ | A01C 7/08 111/130 |
| 1,166,476 A | * | 1/1916 | Parrish ..................... | A01C 7/02 239/653 |
| 1,551,877 A | * | 9/1925 | Henning .................... | 222/240 |
| 2,514,962 A | * | 7/1950 | McElhatton ........... | A01C 15/02 239/683 |
| 3,096,984 A | * | 7/1963 | Garrison ................ | A01C 15/02 239/686 |
| 3,162,153 A | * | 12/1964 | Schulz, Jr. ............... | A01C 7/04 111/51 |
| 3,227,461 A | * | 1/1966 | Love, Jr. ................ | A01C 15/02 222/317 |
| 3,330,445 A | * | 7/1967 | Love, Jr. ............. | A01M 7/0003 222/227 |
| 4,089,441 A | * | 5/1978 | Cole ...................... | A01C 15/02 222/631 |
| 4,140,280 A | * | 2/1979 | Allen .................... | A01C 15/02 239/654 |

(Continued)

*Primary Examiner* — Arthur O. Hall
*Assistant Examiner* — Steven M Cernoch (57) ABSTRACT

A hand-operated spreader has a base, an assembly member, a feeding rudder, an adjusting member, a feeding cone and a container. The feeding cone has the effect of guiding along the cone through the conical body to prevent the feeding aperture from clogging due to moisture, accumulation or weight. The feeding rudder is mounted on the feeding opening of the assembly member and is driven by the rotating handle on one side, and the rotating handle may set the spreading direction along the limiting portions of the open end, which enables the feeding rudder to be reliably positioned via the limiting portion and prevent the feeding rudder from being unstable while improving the dropout accuracy of the discharged material.

4 Claims, 11 Drawing Sheets

(56) References Cited

U.S. PATENT DOCUMENTS

| | | | | |
|---|---|---|---|---|
| 5,123,598 A * | 6/1992 | Courtney | ............... | A01C 15/02 222/473 |
| 5,285,971 A * | 2/1994 | Havlovitz | .............. | A01C 15/02 222/43 |
| 5,305,699 A * | 4/1994 | Wu | ......................... | A01C 7/02 111/183 |
| 6,425,500 B2 * | 7/2002 | McNally | ............ | E01C 19/2025 222/175 |
| 6,810,822 B1 * | 11/2004 | Chan | ..................... | A01C 15/18 111/130 |
| 9,775,283 B2 * | 10/2017 | Claussen | .............. | A01C 15/006 |
| 2012/0256021 A1 * | 10/2012 | DeLorme | ................ | A01C 7/02 239/686 |
| 2017/0202133 A1 * | 7/2017 | Rosenbaum | ............ | A01C 7/02 |

* cited by examiner

HAND-OPERATED SPREADER

BACKGROUND OF THE INVENTION

1. Field of the Invention

The present invention relates to a seed spreader structure, and more particularly to a hand-operated seed spreader.

2. Description of the Related Art

Figure 9:
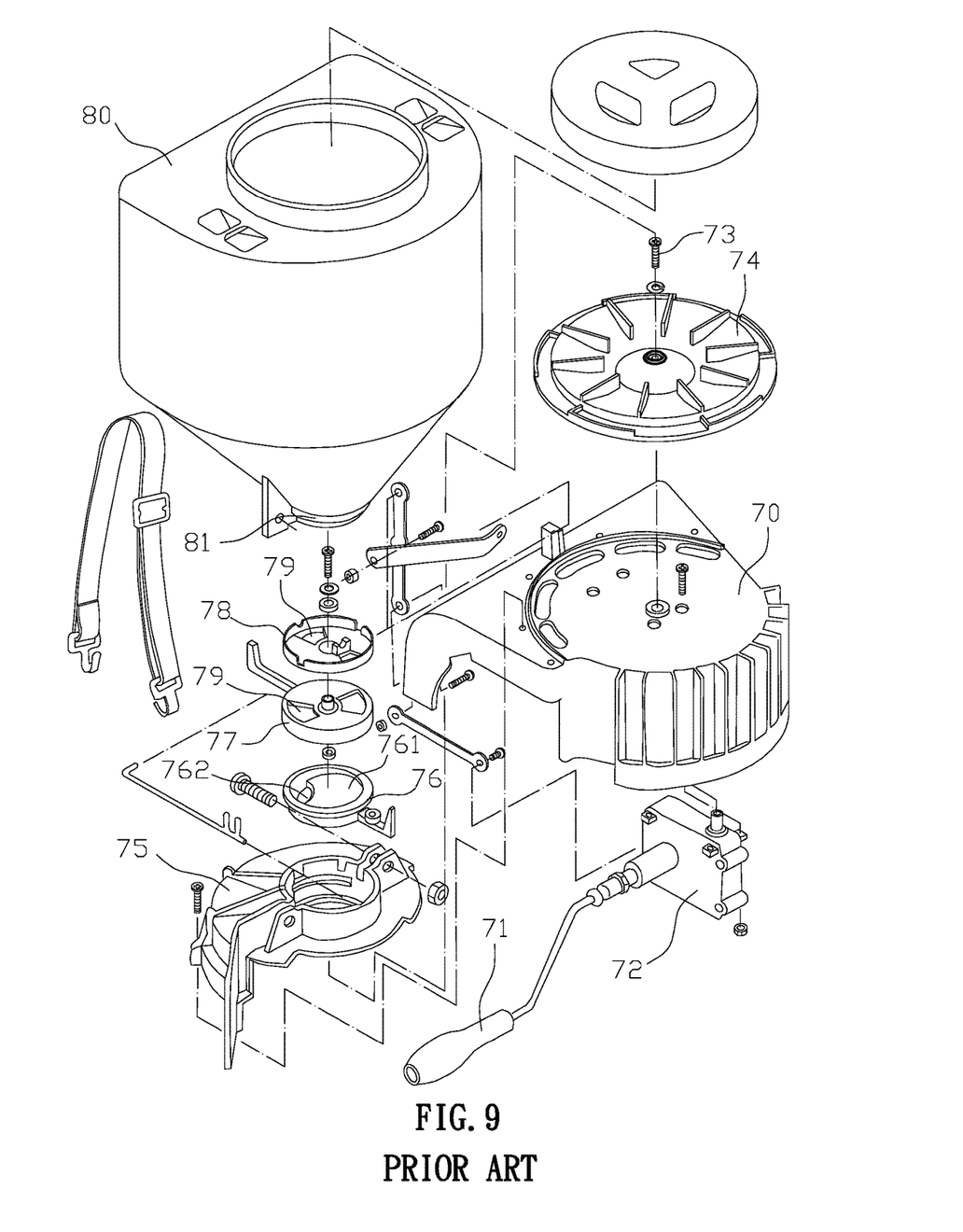
FIG. 9 is an exploded view of a prior art
Figure 10:
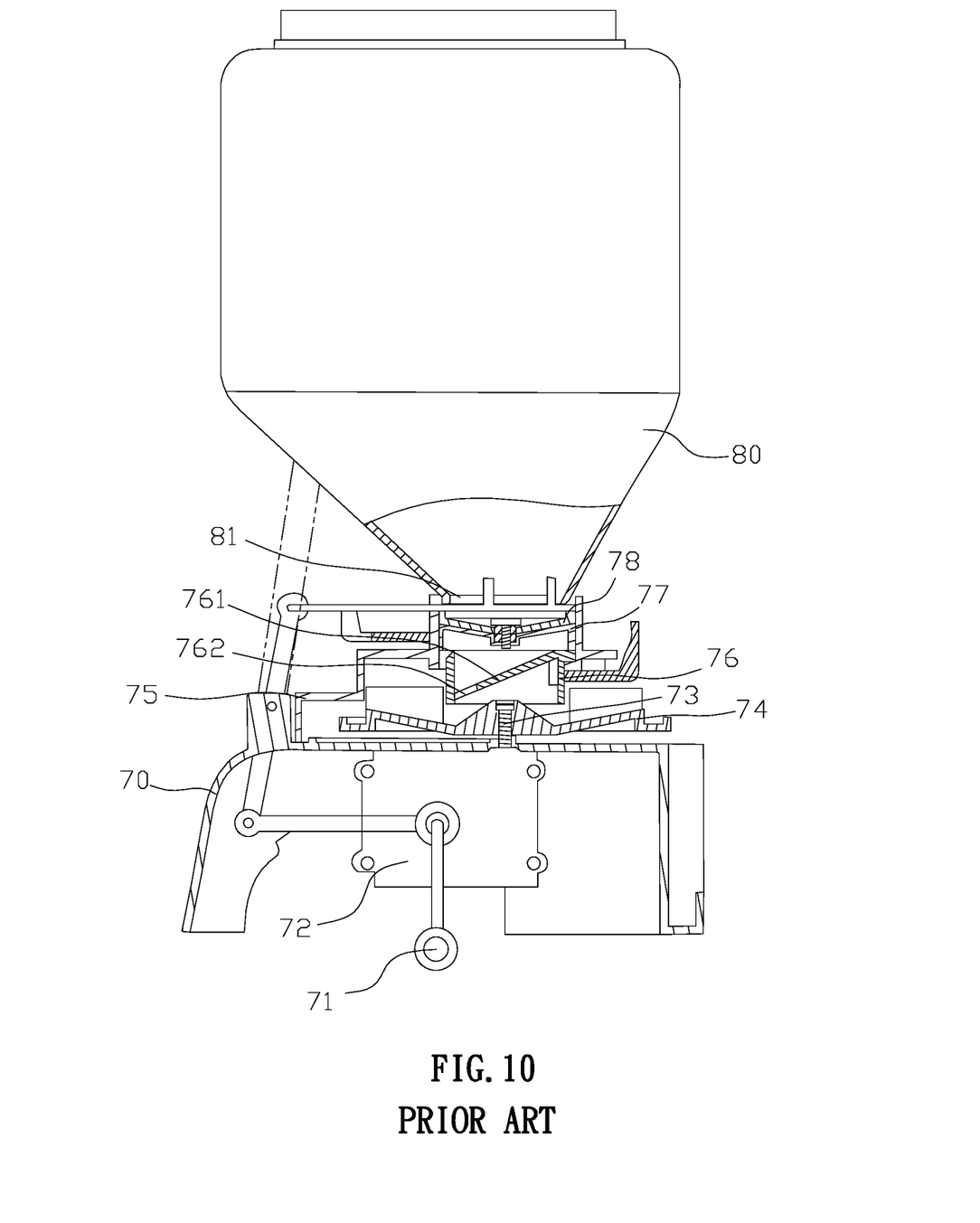
FIG. 10 is a combined sectional view of the prior art.

Referring to FIGS. 9 and 10, a conventional seed spreader includes a base 70 associated with a transmission mechanism 72 having an arm 71. The base 70 is provided with a rotating shaft 73 connected to the transmission mechanism 72, and the rotating shaft 73 engages with a rotating disk 74. The base 70 is combined with a cover 75 for receiving all the above components. A rudder member 76 having a through aperture 762 disposed on an inclined surface 761 is provided above the center of the cover 75. A control plate 77 and a supply plate 78 are stacked over the rudder member 76, wherein the supply plate 78 is disposed on top of the control plate 77 and locked with the cover 75. The control plate 77 is rotatable on the cover 75, and the feeding aperture 79 are disposed misaligned with each other between the control plate 77 and the supply plate 78. The feeding holes 79 are communicated with each other through the rotation of the control plate 77. A container 80 is fastened to the top of the cover 75, and a discharge hole 81 is disposed on the bottom of the container 80 opposite to the feeding plate 78.

Figure 11:
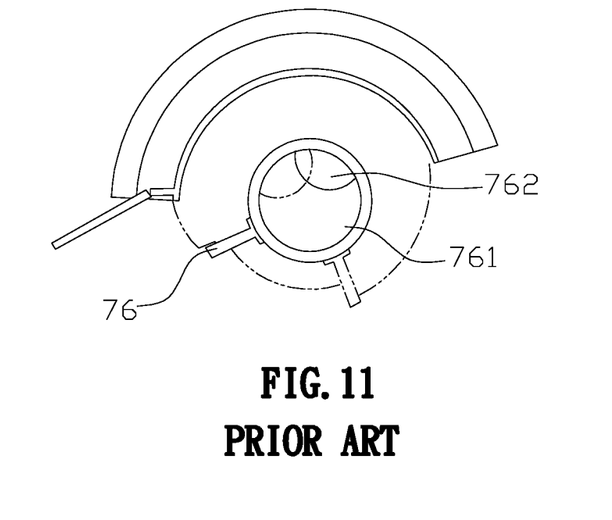
FIG. 11 is a schematic drawing of a conventional rudder component.
Figure 12:
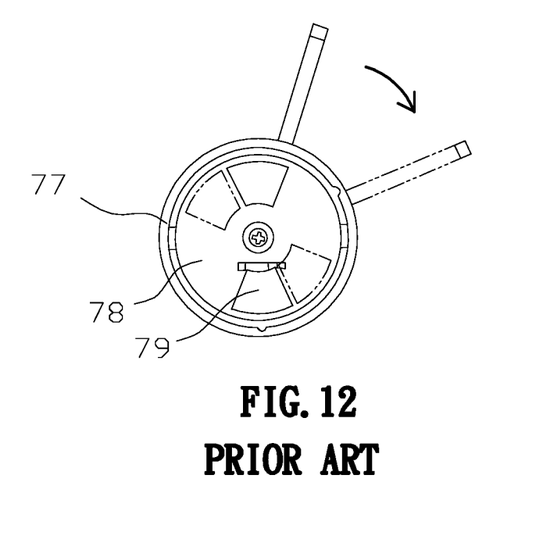
FIG. 12 is a schematic drawing of a conventional control panel.

When the above mentioned structure is in application, please refer to the FIGS. 10, 11 and 12. The seeds are placed in the container 80 and dropped onto the supply tray 78 through the discharge hole 81. By rotating the control plate 77 to connect the two the feeding apertures, the seeds fall through the feeding aperture 79 onto the inclined surface 761 of the rudder member 76, and then fall through the through apertures 762 and being discharged by the rotating disk 74.

However, it is not difficult to find that there are some shortcomings in the conventional structure. The main reasons are as follows: (1) When the seeds fall through the discharge hole 81 of the container 80 and lay on the supply tray 78, the supply tray 78 is flat without a guiding effect and lacks a stirring mechanism, resulting in easy occurrence of accumulated effect due to moisture or heavy pressure, which can not be effectively discharged through the feeding aperture 79. On the other hand, although the control panel 77 can be rotated to adjust the amount of the seeds, the control panel 77 lacks the positioning effect, resulting in the control panel 77 being easily touched by mistake.

(2) The rudder member 76 can be rotated to adjust the position of the through aperture 762 such that the direction and the range of the spraying the seeds can be adjusted as the through aperture 762 changes in position. However, in practice, the rudder member 76 also lacks a positioning device so that the rudder member 76 can not be fixed after being adjusted and the rudder member 76 can be easily and freely swung which affects the stability of the discharging direction and causes inconsistency.

Therefore, it is desirable to provide a hand-operated spreader to mitigate and/or obviate the aforementioned problems.

SUMMARY OF INVENTION

An objective of present invention is to provide a hand-operated seed spreader which is capable of improving the above-mention problems.

In order to achieve the above mentioned objective, a hand-operated spreader has a base, an assembly member, a feeding rudder, an adjusting member, and a feeding cone. The base has a transmission mechanism with an operating arm and a rotating disk driven by the transmission mechanism. The assembly member is disposed above the rotating disk of the base, an open end is provided on a side of the assembly member and configured for distributing, a limiting portion with a continuous curve is provided on the open end, a feeding opening provided at a center portion of the assembly opposite engaging slots is disposed on a circular sidewall corresponding to a container. The feeding rudder is rotatably mounted in the feeding opening of the assembly member the feeding rudder having an inclined surface and a through aperture on the inclined surface, the feeding rudder further has a rotating handle extending from the open end of the assembly member and configured to move along the limiting portion with a plurality predetermined positions. The adjusting member is rotabaly mounted inside the circular sidewall of the feeding opening, the circular sidewall having a T-shaped limiting gap for limiting the adjusting member, the adjusting member further has a tapered casing with at least three holes inside the circular sidewall, opposing sides of the three holes provided with a mixing rod; a side of the adjusting member is provided with a control handle extending from the limiting gap, a guiding slot disposed on the assembly member, the guiding slot has a slidable limiting bar for moving the control handle. The feeding cone is fixed in the circular sidewall of the feeding opening and overlays the tapered casing of the adjusting member and having at least three feeding apertures corresponding to the three holes of the tapered casing.

Other objects, advantages, and novel features of invention will become more apparent from the following detailed description when taken in conjunction with the accompanying drawings.

DETAILED DESCRIPTION OF PREFERRED EMBODIMENT

Figure 1:
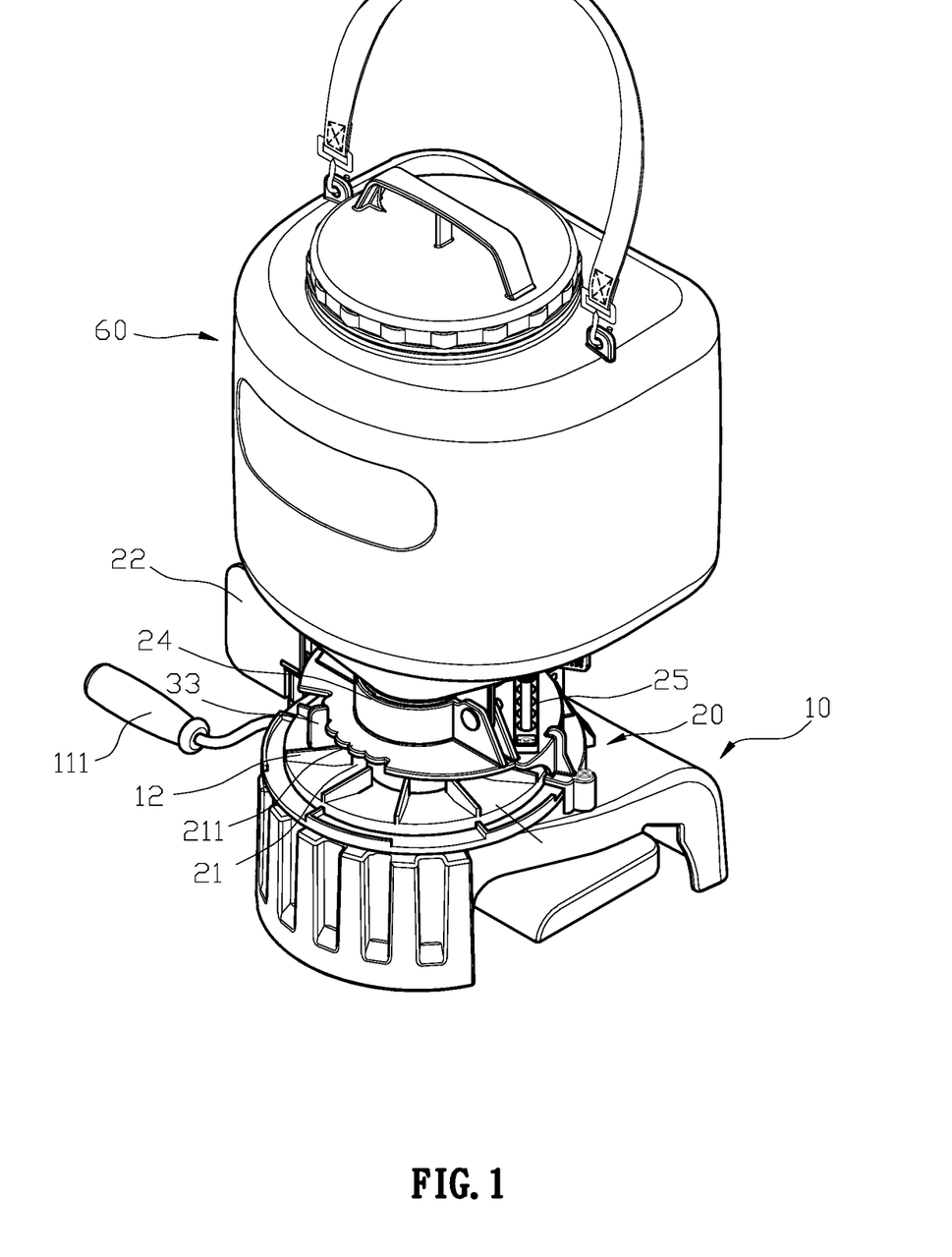
FIG. 1 is a perspective view according to a preferred embodiment of the present invention.
Figure 2:
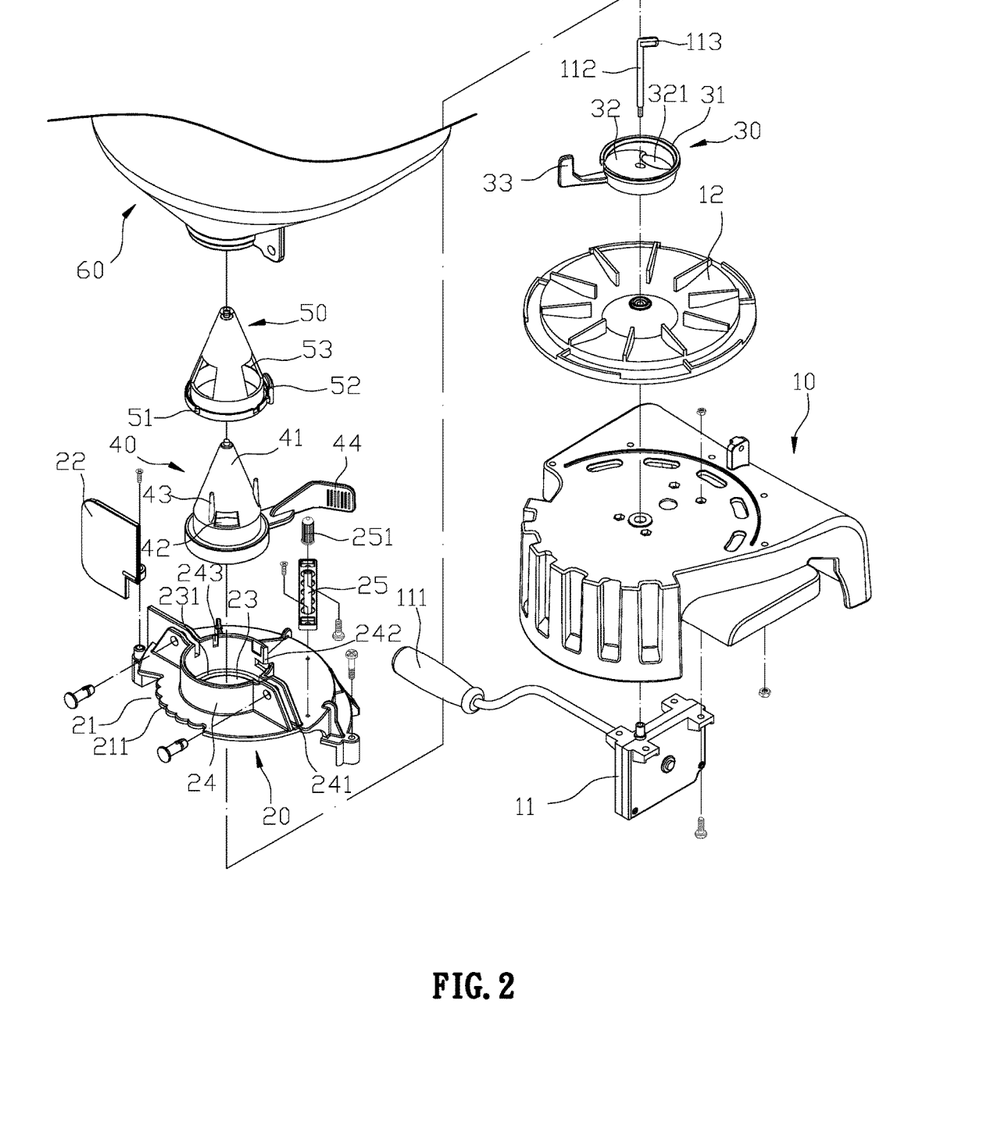
FIG. 2 is an exploded view according to the preferred embodiment of the present invention.

First, please refer to FIG. 1 and FIG. 2, a hand-operated spreader comprises a base 10, an assembly member 20, a feeding rudder 30, an adjusting member 40, and a feeding cone 50. The base 10 is provided with a transmission mechanism 11 with an arm 111, and a rotating disk 12 connected to the transmission mechanism 11, and the transmission mechanism 11 is drives the rotating disk 12 through a central shaft 112. The assembly member 20 is mounted on the base 10 above the rotating disk 12 and one side of the assembly member 20 is provided with an open end 21 for discharging objects during rotation of the rotating disk 12. A protective barrier 22 is pivotally provided on one side of the open end 21 to prevent spilled material. The open end 21 is further provided with a continuous wave-shaped limiting portion 211, the assembly member 20 is centrally provided with a feeding opening 23, a circular sidewall 24 is arranged upwards from the feeding opening 23, and more than one engaging slots 241 are symmetrically arranged outside of the circular sidewall 24 to engaging with a container 60. The feeding rudder 30 is rotatably assembled in the feeding opening 23 of the assembly member 20, and the bottom of the feeding opening 23 is provided with a stopping portion 231. Furthermore, a ring 31 is disposed on the outer periphery of the feeding rudder 30, for setting the feeding rudder 30 onto the feeding opening 23. The feeding rudder 30 has an inclined surface 32 and a through aperture 321 is provided on a lower end of the inclined surface 32. The central shaft 112 of the transmission mechanism 11 places through the inclined surface 32 of the feeding rudder 30, and a mixing portion 113 is provided at the top of the central shaft 112. The feeding rudder 30 is further provided with a rotating handle 33 extending from the opening end 21 of the assembly member 20. A plurality of positioning grooves disposed along the limiting portion 211 for setting the discharging direction. The adjusting member 40 is rotatably assembled in the circular sidewall 24 of the feeding opening 23, and the circular sidewall 24 is provided with a T-shaped limiting gap 242 to limit the adjusting member 40. The adjusting member 40 is convexly disposed in the circular sidewall 24 and has a tapered casing 41, and at least three holes 42 are evenly disposed on the tapered casing 41. A mixing rod 43 is respectively disposed on each side of the three holes 42, and a control handle 44 is integrally provided on one side of the adjusting member 40. The control handle 44 extends from the limiting gap 242, in order to adjust the position of the control handle 44, a guiding slot 25 with a limiting bar 251 is provided on the assembly member 20 such that Therefore, the position of the control handle 44 can be adjusted through the limiting bar 251. The feeding cone 50 is non-rotatably fixed onto the circular sidewall 24 of the feeding opening 23, and the circular sidewall 24 is provided with a plurality of limiting openings 243 for correspondingly engaging with a plurality of ribs 51 disposed on the periphery of the feeding cone 50. The feeding cone 50 is further provided with a protrusion 52 engaging with the limiting gap 242 and overlapping the tapered casing 41 of the adjusting member 40. The feeding cone 50 further has at least three feeding holes 53 corresponding to the three holes 42 of the tapered casing 41.

Figure 3:
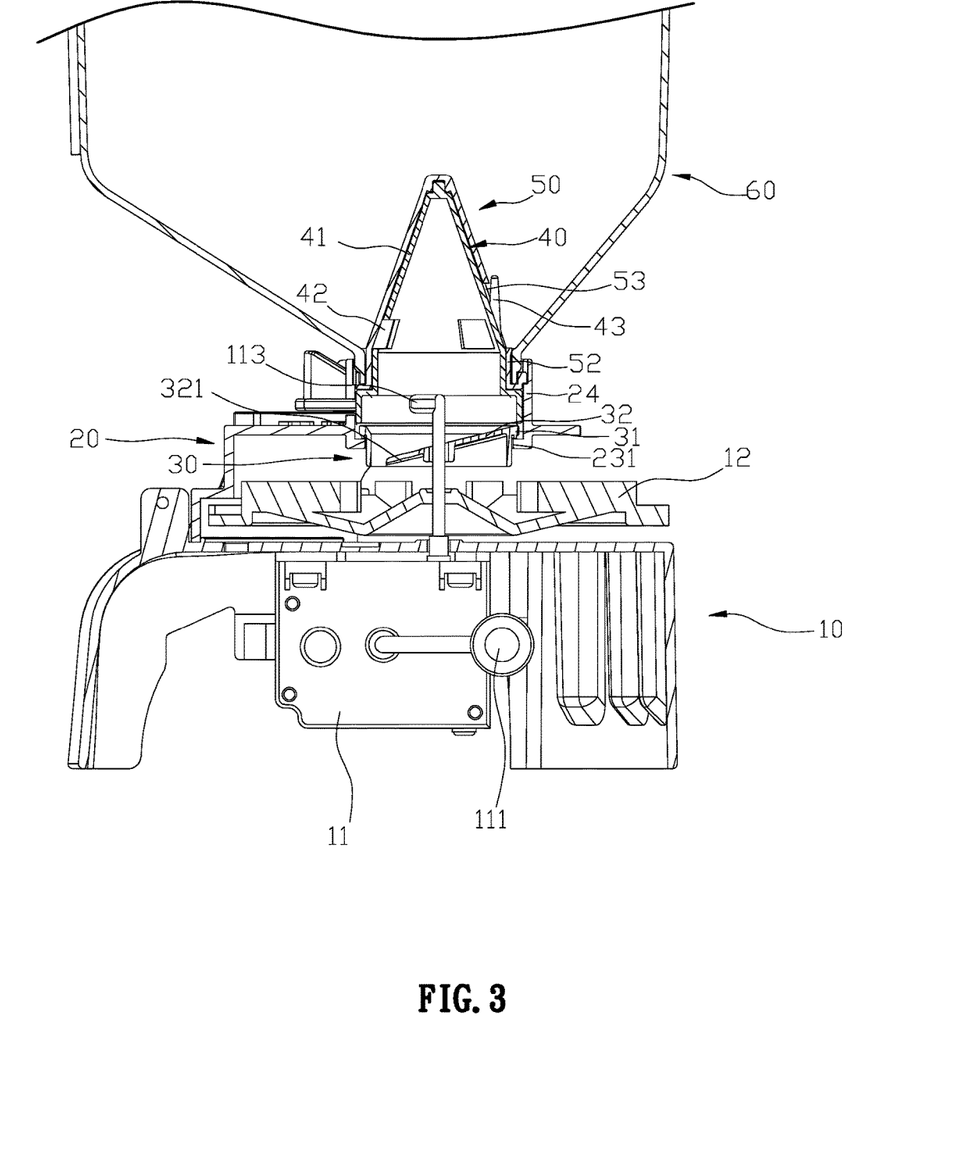
FIG. 3 is a combined sectional view according to the preferred embodiment of the present invention.

The composition of the structure, please see also FIG. 1, FIG. 2 with FIG. 3. The base 10 is attached with the transmission mechanism 11 below and a rotating disk 12 above. The assembly member 20 allows the feeding rudder 30 to be mounted on the bottom of the feeding opening 23. The feeding rudder 30 utilizes the ring 31 to push against to the stopping portion 231 of the feeding opening 23, and the rotating handle 33 on the side of the feeding rudder 30 is projected from the open end 21. The feeding rudder 30 rotatably engages with the limiting portion 211. The assembly member 20 is mounted on the base 10 above the rotating disk 12 and then the central shaft 112 passes through the feeding rudder 30 and the rotating disk 12 and is pivotally connected to the transmission mechanism 11 to pivotally connect the rotating disk 12 and the transmission mechanism 11 together to rotate the central shaft 112 and the feeding rudder 30. A mixing portion 113 provided with the shaft 112 is above the feeding rudder 30. The adjusting member 40 is mounted on the circular sidewall 24 of the assembly member 20, and the control handle 44 extending through the limiting gap 242 on one side of the circular sidewall 24, so that the control handle 44 can be adjusted to the right and left in the limiting gap 242 and limited by the limiting bar 251 on the guiding slot 25. The tapered casing 41 of the adjusting member 40 protrudes from the circular sidewall 24, and the hole 42 and the mixing rod 43 are also higher than the circular the sidewalls 24. The feeding cone 50 is similarly arranged in the circular sidewall 24 and fixed by the rib 51 engaging with the limiting opening 243 of the circular sidewall 24. Also, the protrusion 52 engages with the limiting gap 242 on the side of the circular sidewall 24 to secure the feeding cone 50 and align the feeding aperture 53 with the holes 42 and the mixing rod 43, such that the adjusting member 40 can control the connection between the holes 42 and the feeding apertures 53 to control the amount of discharging. A bottom of the container 60 is installed within the circular sidewall 24 of the assembly member 20 and the feeding cone 50 is accepted in the container 60.

Figure 4:
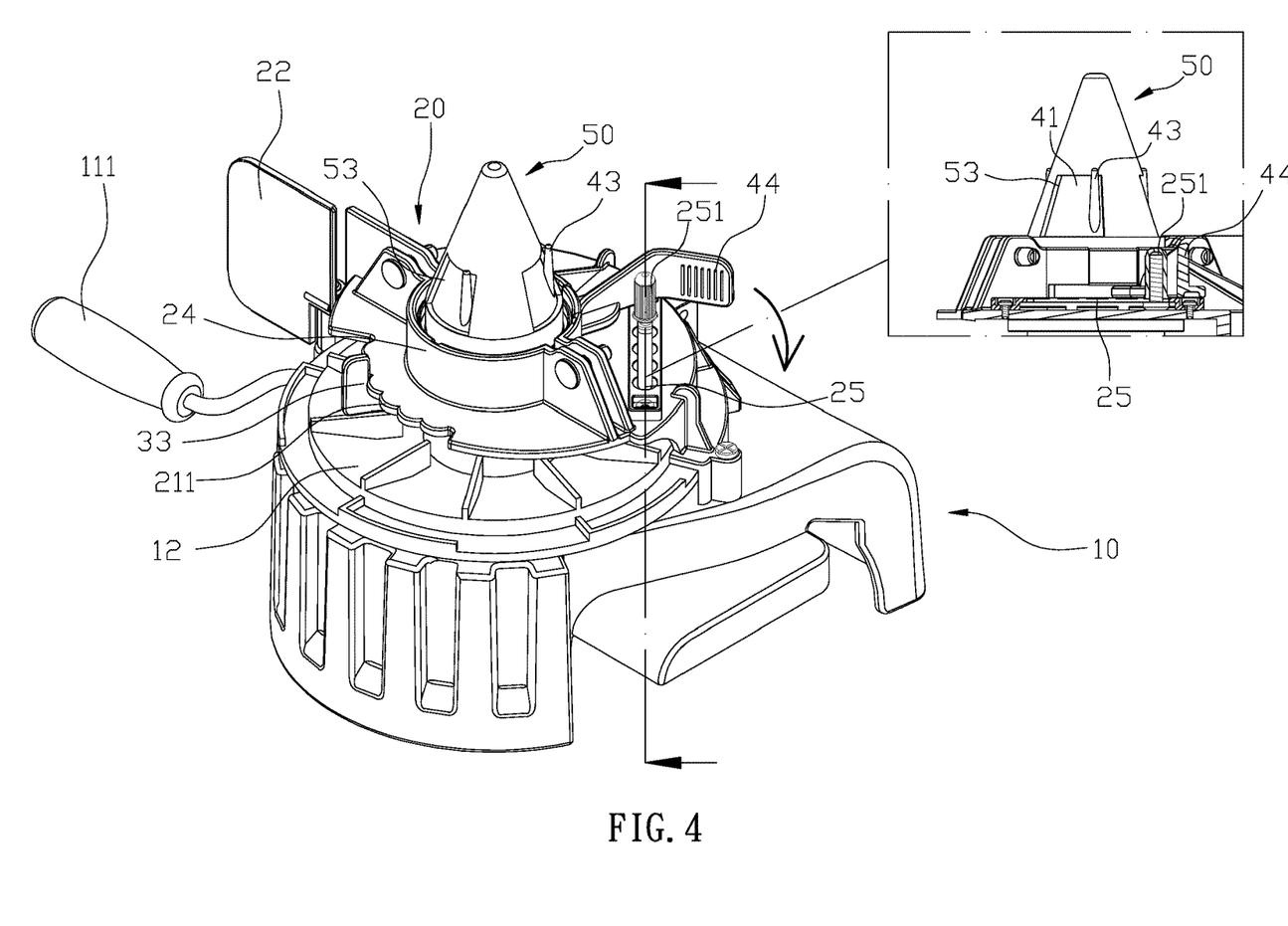
FIG. 4 is a partial enlarged view according to the preferred embodiment of the present invention.
Figure 5:
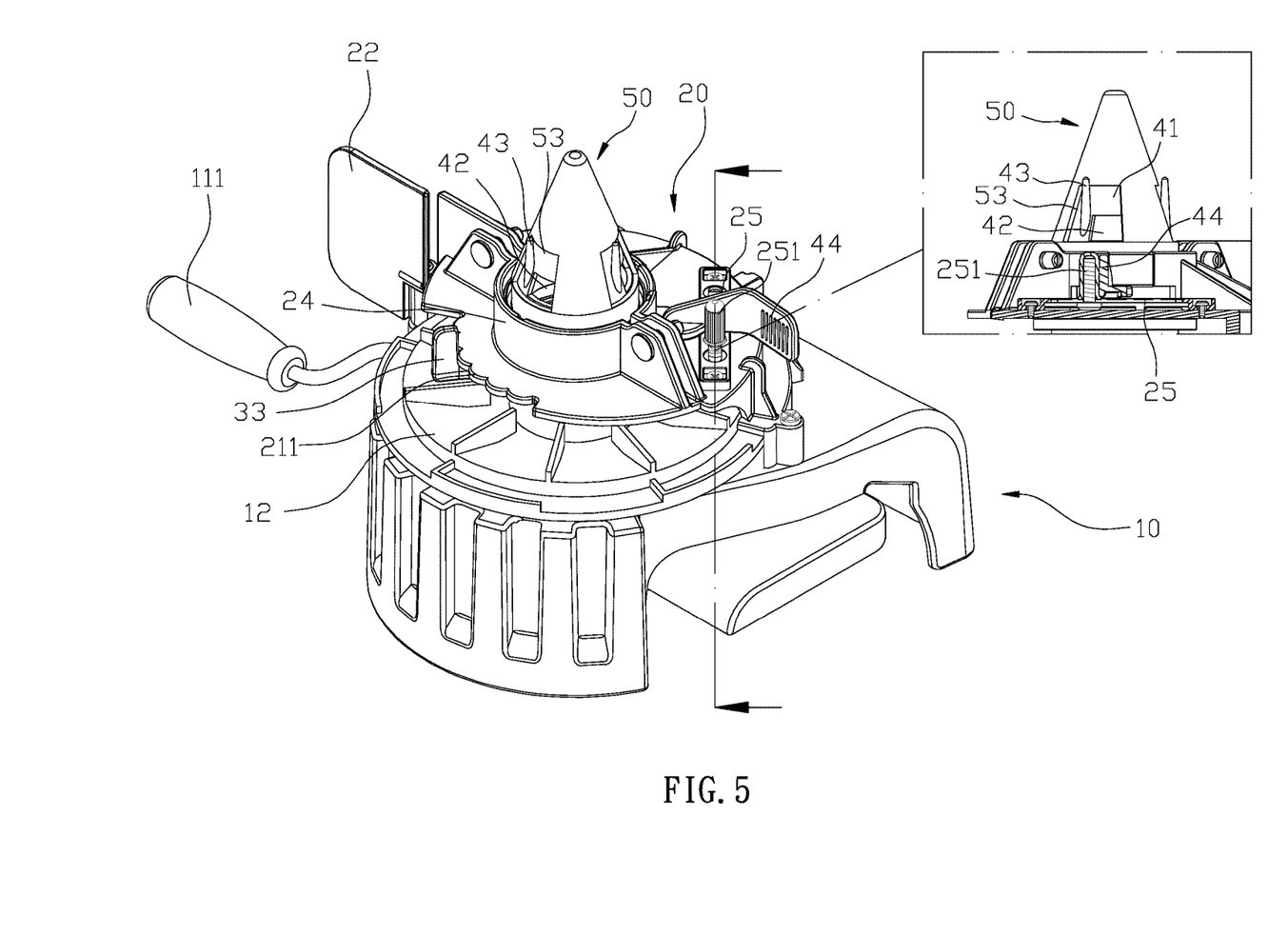
FIG. 5 is a partial enlarged view of the adjusting member according to the preferred embodiment of the present invention.

The actual application, please refer to FIG. 1 with the FIGS. 4 and 5. The top of the container 60 has an opening and a corresponding cap for entering material into the container 60 and the material slides along the feeding cone 50 towards the feeding opening 23 to move through the feeding aperture 53 and the hole 42 of the adjusting member 40, and the adjusting member 40 can be further rotated by the control handle 44, which causes the mixing rod 43 to stir the material so the material can be loosened to enhance the sliding efficiency. The guiding slot 25 and the limiting bar 251 of the assembly member 20 limit the range of rotation of the control handle 44 to limit the gap formed between the hole 42 and the feeding aperture 53 so as to control the amount of the discharged material.

Figure 6:
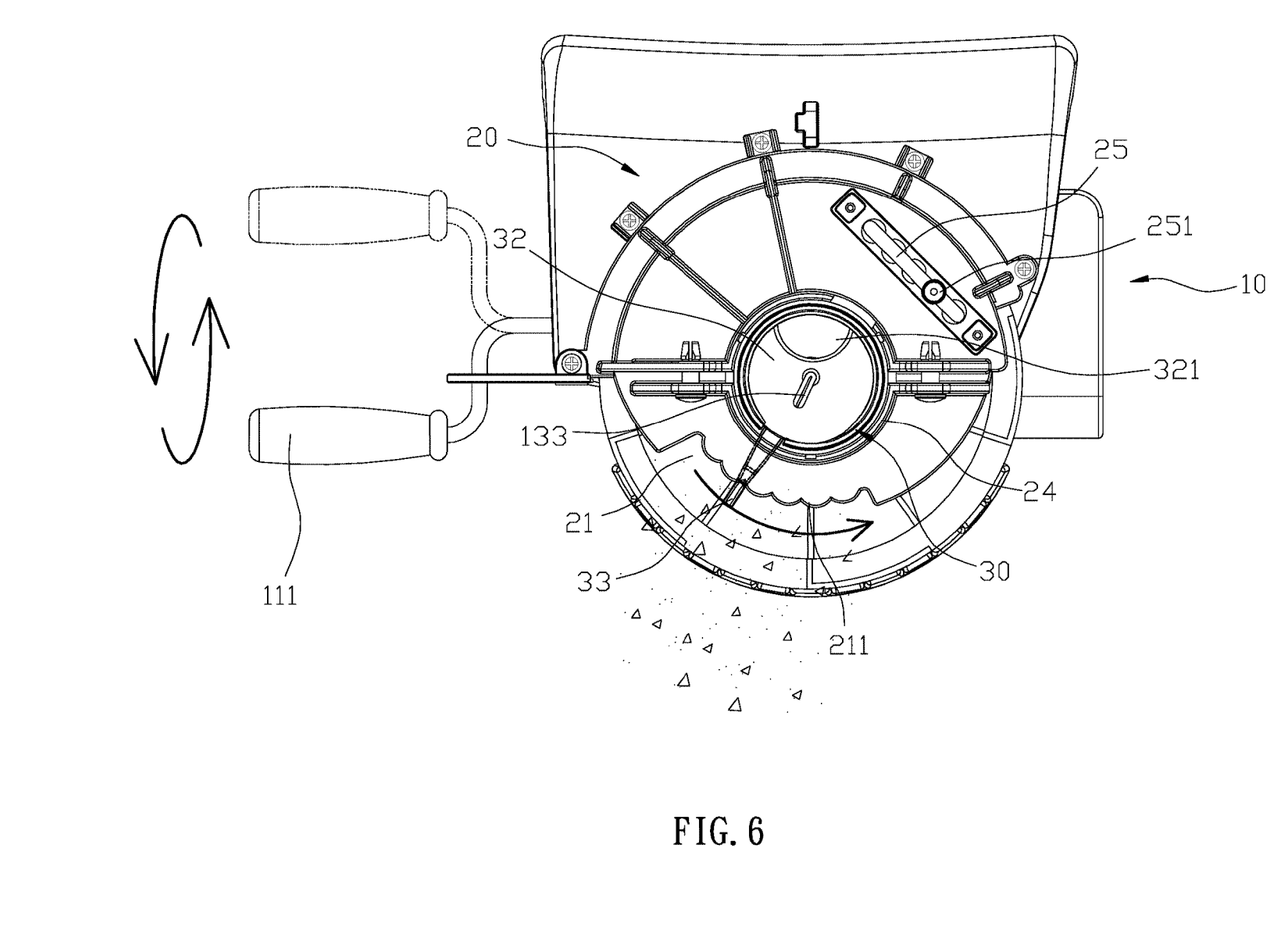
FIG. 6 shows the state of use according to the preferred embodiment of the present invention.
Figure 7:
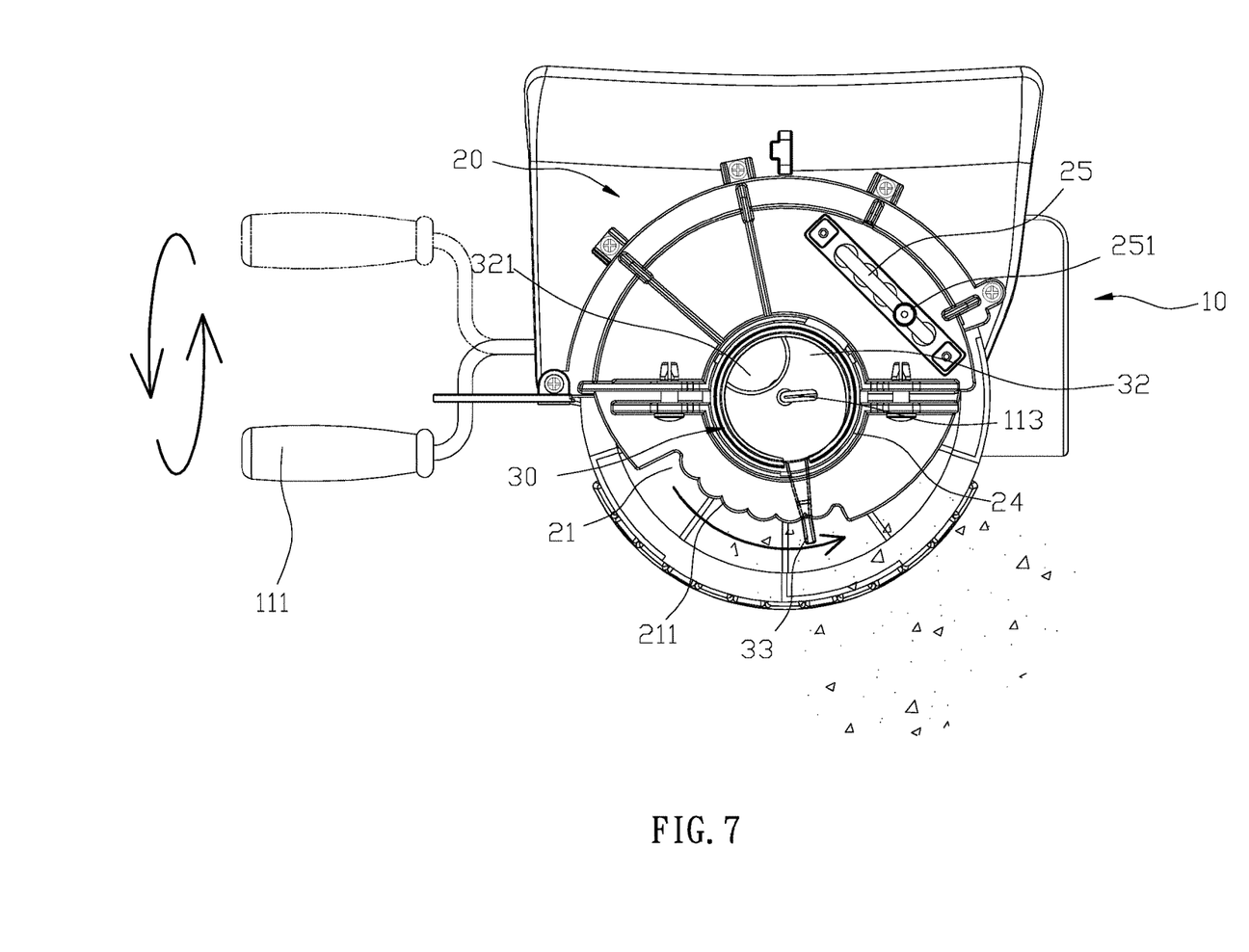
FIG. 7 is a schematic drawing of the feeding rudder and its discharging direction according to the preferred embodiment of the present invention

In addition, as shown in FIGS. 6 and 7, the material falls into the inclined surface 32 of the feeding rudder 30 after passing through the hole 42, and through the aperture 321 of the inclined surface 32 to exit. Finally, by swinging the arm 111, the rotating disk 12 is rotated by the transmission mechanism 11 to discharge the material through the through aperture 321 so that the material can be dispensed through the open end 21 of the assembly member 20. Furthermore, the feeding rudder 30 can be further rotated by the rotating handle 33, and the rotating handle 33 has a plurality of positioning states along the limiting portions 211 for fixing the position of the through aperture 321 of the feeding rudder 30 to control the direction and extent of the discharging.

Figure 8:
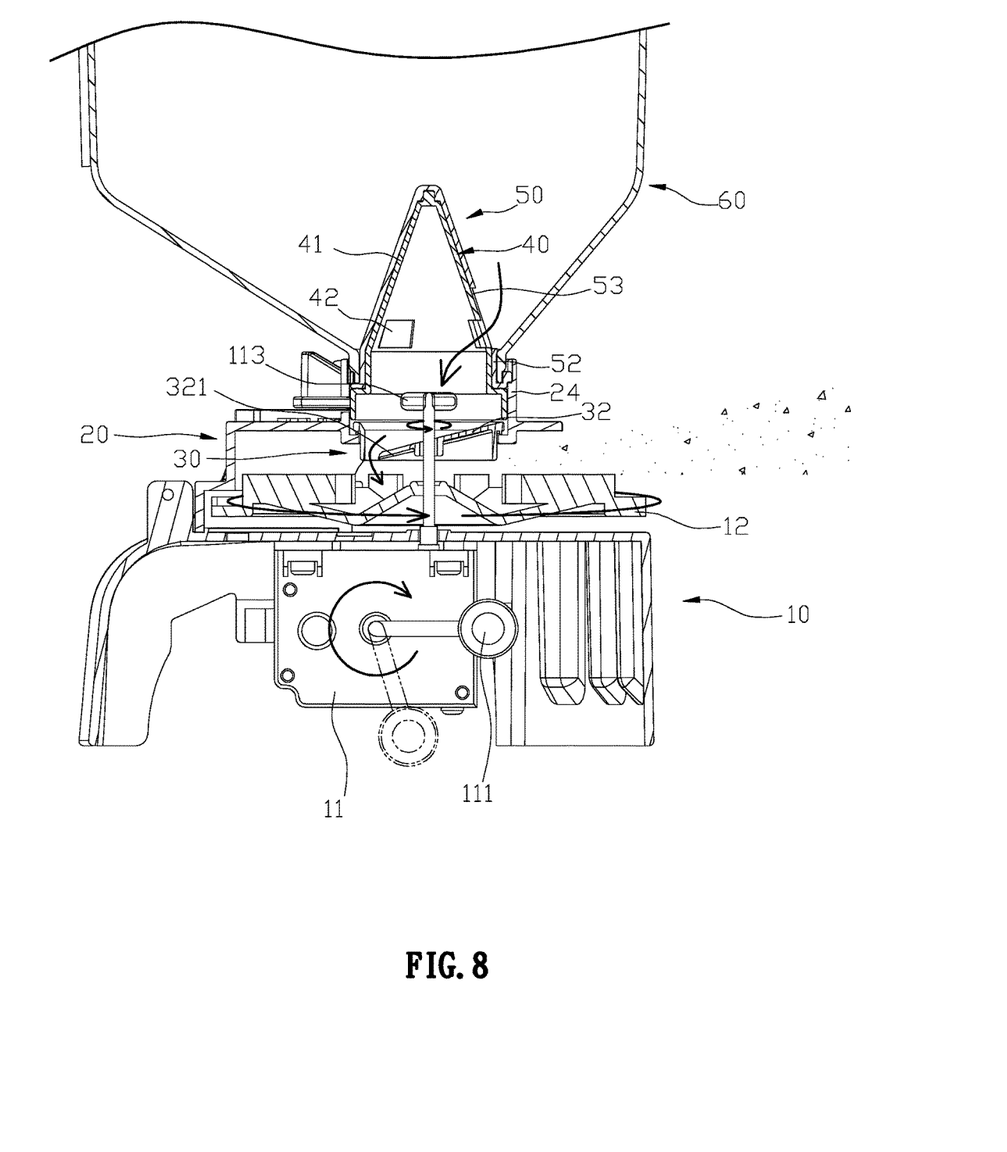
FIG. 8 is a sectional view showing the state of use according to the preferred embodiment of the present invention.

Moreover, when the rotating disk 12 is rotated, the mixing portion 113 of the central shaft 112 protruding above from the feeding rudder 30 simultaneously agitate and scatter the material, as shown in FIG. 8, to loose material to avoid blockage of the through aperture 321 due to damp or accumulation.

With the above mentioned embodiment, the following benefits can be obtained:

(1) The feeding cone 50 has the effect of guiding along the cone through the conical body to prevent the feeding aperture 53 from clogging due to moisture, accumulation or weight.

(2) The feeding rudder 30 is mounted on the feeding opening 23 of the assembly member 20 and is driven by the rotating handle 33 on one side, and the rotating handle 33 may set the spreading direction along the limiting portions 211 of the open end 21, which enables the feeding rudder 30 to be reliably positioned via the limiting portion 211 and prevent the feeding rudder 30 from being unstable while improving the dropout accuracy of the discharged material.

(C) The central shaft 112 linked with the rotating disk 12 is further provided with a mixing portion 113 at the top, while the rotating disk 12 spins out the material which drops into the inclined surface 32 of the feeding rudder 30 through the feeding apertures 53, the material is also loosened by the agitation of the mixing portion 113 to prevent from clogging the through aperture 321 due to damp or accumulation, thereby improving the discharge of the discharging.

Although the present invention has been explained in relation to its preferred embodiment, it is to be understood that many other possible modifications and variations can be made without departing from the spirit and scope of invention as hereinafter claimed.

What is claimed is:

1. A hand-operated spreader comprising:
    a base having a transmission mechanism with an operating arm and a rotating disk driven by the transmission mechanism;
    an assembly member disposed above the rotating disk of the base, an open end provided on a side of the assembly member and configured for distributing, a limiting portion with a continuous curve provided on the open end, a feeding opening provided at a center portion of the assembly opposite engaging slots disposed on a circular sidewall corresponding to a container;
    a feeding rudder rotatably mounted in the feeding opening of the assembly member, the feeding rudder having an inclined surface and a through aperture on the inclined surface, the feeding rudder further having a rotating handle extending from the open end of the assembly member and configured to move along the limiting portion with a plurality of predetermined positions;
    an adjusting member rotatably mounted inside the circular sidewall of the feeding opening, the circular sidewall having a T-shaped limiting gap for limiting the adjusting member, the adjusting member further having a tapered casing with at least three holes inside the circular sidewall, opposing sides of the three holes provided with a mixing rod; a side of the adjusting member provided with a control handle extending from the limiting gap, a guiding slot disposed on the assembly member, the guiding slot having a slidable limiting bar for moving the control handle; and
    a feeding cone fixed in the circular sidewall of the feeding opening and overlaying the tapered casing of the adjusting member and having at least three feeding apertures corresponding to the three holes of the tapered casing.

2. The hand-operated spreader of claim 1, wherein the transmission mechanism drives the rotating disk via a central shaft, the central shaft also passing through the inclined surface of the feeding rudder, and a mixing portion is disposed on a top end of the central shaft.

3. The hand-operated spreader of claim 1, wherein the assembly member further comprises a plurality of limiting openings on the circular sidewall and configured for correspondingly engaging with a plurality of ribs of the feeding cone, and the feeding cone is further provided with a protrusion engaging with the limiting gap.

4. The hand-operated spreader of claim 1, wherein a stopping portion is provided on a bottom of the feeding opening of the assembly member, and a ring is disposed around the feeding rudder and configured for assembly with the feeding opening and providing positioning through the limiting portion of the open end the of the assembly member.

* * * * *